United States Patent Office 3,071,720
Patented Jan. 1, 1963

3,071,720
CONTROLLED POWER RECTIFIER SYSTEM
Heinz Geissing, Erlangen, Germany, assignor to Siemens-Schuckertwerke Aktiengesellschaft, Erlangen, Germany, a corporation of Germany
Filed Aug. 5, 1960, Ser. No. 47,768
Claims priority, application Germany Aug. 7, 1959
10 Claims. (Cl. 321—18)

My invention relates to systems of controlled power rectifiers, as used, for example, for energizing a regulated electric drive, in which the ignition control of the individual rectifier members is limited to two pre-selected ignition-angle values, one in the cycle range of rectifier performance and the other in the range of inverter performance, and in which an electronic regulator abruptly switches the ignition angle from one to the other value in response to directional changes in departure of the regulated quantity from a given datum (pattern) value. Such systems of control are disclosed in the copending application Serial No. 850,633, filed November 3, 1959, assigned to the assignee of the present invention.

When applying such a rectifier control system to a multi-phase rectifier network with an interphase auto-transformer, for example to a six-phase double-Y network, the above-mentioned control performance by abruptly switching between fixed ignition angles for rectifier and inverter operation, may cause the rectifier valve members in one group of the system to be ignited more often than those in the other group, thus subjecting the two groups to different current loads. Due to such asymmetry of the current flowing in the two component groups of rectifier members, the interphase transformer may become pre-magnetized and may thus lose its ability to absorb voltage, so that the overall performance of the system is impaired.

It is an object of my invention to eliminate such trouble.

To this end, and in accordance with a feature of my invention, a multi-phase double-star system of rectifiers—having an interphase transformer connected between the star points of the two groups of valve members and having the ignition moments of these valve members controlled to abruptly switch between two fixed phase positions for rectifier and inverter operation respectively—is provided with auxiliary regulating means which comprise a sensing circuit connected with the interphase transformer for response to asymmetrical current distribution in the two valve groups, and which further comprise pulse generating means controlled by the sensing circuit and connected to the main ignition-moment control means for superimposing upon the ignition control a correction toward load balance in the two valve groups. Preferably the main regulating means are provided with two separate amplifier end stages which are connected to respective ignition-angle control sets of the two valve groups, and the corrective pulses additionally generated by the auxiliary regulating means are applied to at least one of these two end stages.

The duration of the additional pulses thus supplied by the auxiliary regulating means is preferably larger than 60° electrical. Therefore, in accordance with another feature of the invention, the two output leads of the auxiliary regulator means are provided with respective diodes so poled as to pass the corrective pulses of positive polarity to the ignition-control set for the one rectifier valve group of higher current loading, whereas the negative pulses are applied to the other ignition-control set.

As a result, the valve group subjected to the heavier current loading receives from its ignition-angle control set an additional ignition pulse whose phase position (ignition angle α) corresponds to the highest permissible control for inverter operation, for example α=150°, whereby the load current in that group is lowered. At the same time, the additional negative pulse acting upon the ignition-angle control set of the other group causes this set to issue an additional pulse at the ignition angle α=0 for full rectifier operation, thus causing an increase in load current passing through the second valve group. In double-star connected multi-phase rectifiers with interphase transformer, the voltages of the two valve groups are 60° displaced from each other. Consequently, when the additional pulses have a duration of at least 60°, one of the simultaneously issuing additional pulses will always be effective.

The invention will be further described with reference to the embodiments of controlled rectifier systems illustrated by way of example on the accompanying drawings in which.

Figure 1:
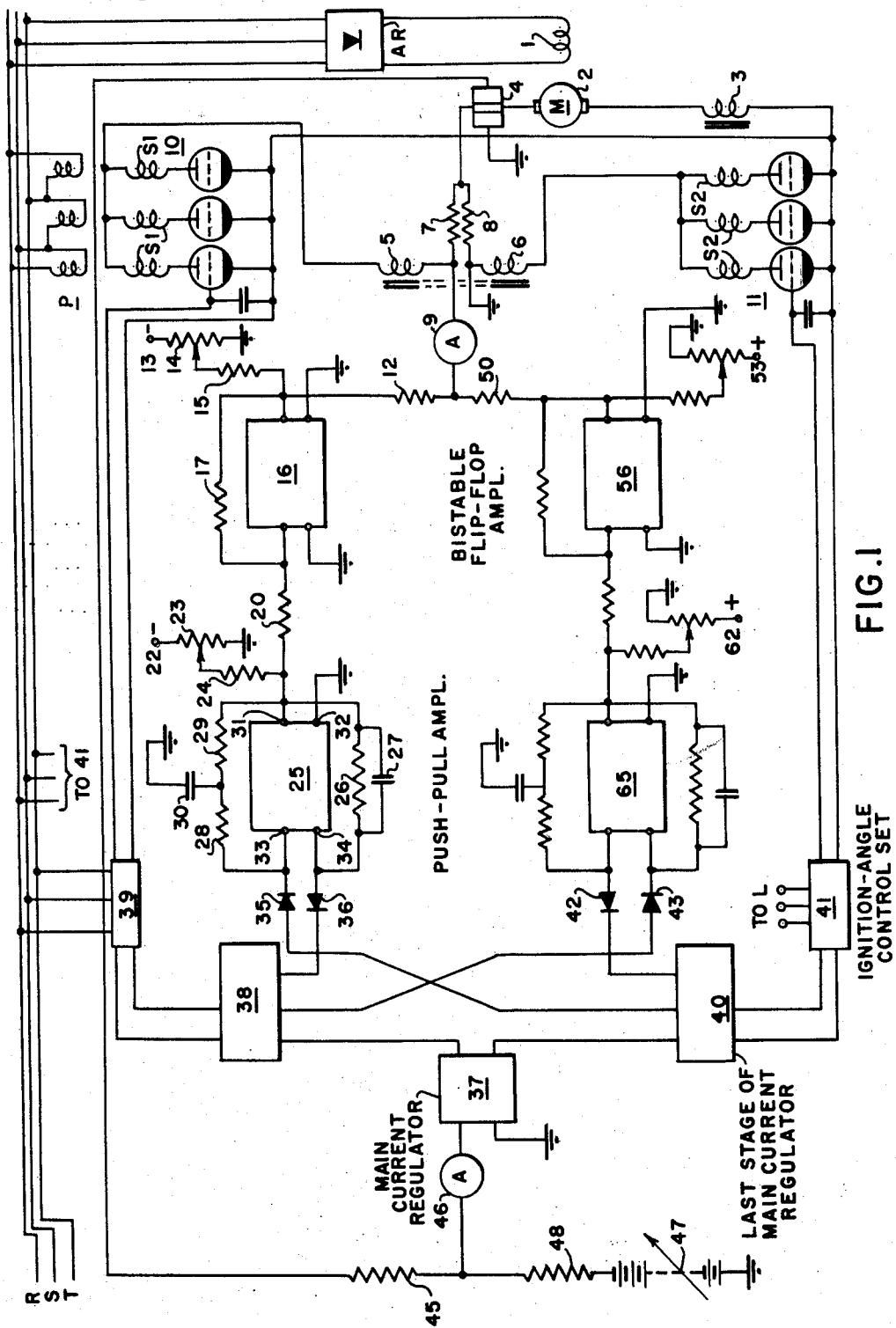
FIG. 1 illustrates schematically a block diagram of a rectifier system according to the invention.

The rectifier system illustrated in FIG. 1 supplies controlled and regulated direct current to a motor M from the phase buses R, S, T of an alternating-current line. The field winding 1 of motor M receives normally constant excitation voltage, for example through an auxiliary rectifier AR from line RST. The particular design of rectifier AR and of the field circuit are of no consequence to the invention proper.

The armature 2 of motor M is connected in the load circuit of a controllable power rectifier in series with a smoothing reactor 3 and a Hall-voltage generator 4. The voltage generator 4 serves as a sensing member for supplying the main regulating system of the power rectifier with variable pilot voltage indicative of the current flowing in the armature circuit. The design and operation of a Hall-voltage generator are more fully illustrated and described in my copending application Serial No. 45,633, filed July 28, 1960, now abandoned, although it will be understood that any other current-responsive sensing means may be used instead, for example an IR-drop resistor series-connected in the armature circuit to develop a voltage drop proportional to the armature current, according to said application Serial No. 850,633.

The power rectifier comprises two three-phase groups 10 and 11 of controllable electric valve members illustrated, for example, as single-anode mercury-pool rectifier tubes. The valve members of each three-phase group are star or Y-connected in series with respective secondary windings S1, S2 of a power transformer whose delta-connected primaries P are energized from the line RST. The two star points of respective groups 10 and 11 are connected with each other through two winding portions 5 and 6 of an inter-phase autotransformer. The two winding portions have the same number of turns. Serially connected between winding portions 5 and 6 are two resistors 7 and 8 to whose common midpoint the armature circuit of motor M is attached. The other terminal of the armature circuit is connected to a common cathode bus of the two rectifier groups.

The resistors 7 and 8 from part of a sensing circuit for the auxiliary regulator described below. This sensing circuit is grounded at a circuit point between resistor 8 and winding portion 6. When the two valves groups 10 and 11 carry equal amounts of current loading, the voltage drops at respective resistors 7 and 8 are equal and opposed to each other so that their resultant is zero. However, when the load current distribution in the two valve groups and hence in the two winding portions 5 and 6 becomes asymmetrical for the reasons explained above, the total voltage drop across the series connection of resistors 7 and 8 assumes a finite magnitude of positive or negative polarity depending upon which of the two valve groups carries more current than the other. The resulting error current is measured by an ammeter 9 which preferably has two measuring ranges on either side of a zero position. From ammeter 9 the error current is supplied to the auxiliary regulator still to be described. The ammeter 9 indicates the direction and magnitude of the asymmetry current in the two winding portions 5 and 6 of the interphase transformer and thus any difference in loading between the two valve groups 10, 11.

Before dealing with details of the auxiliary regulator responsive to asymmetrical loading of the two valve groups, a brief description of the main regulating devices will be given. These main regulating devices serve to switch the two valve groups 10 and 11 abruptly between two fixed ignition angles in the range of rectifier operation and inverter operation respectively, when the current-responsive voltage from Hall generator 4 departs from the given datum (pattern) valve. The pattern value of armature curren to be kept constant by the main regulating system is selectively set by means of an adjustable voltage source 47. The corresponding pattern current is supplied through a resistor 48 and an ammeter 46 to a main current regulator 37 in differential relation to the current passing from the current-responsive sensing member 4 through a resistor 45 to the ammeter 46. The ammeter 46 indicates the difference between the pattern and the pilot values of current.

When the pattern value adjusted at source 47 coincides with the pilot value sensed by member 4, no error current is supplied to the input stage of the main regulator 37. However, when the actual (pilot) value of armature current departs upwardly or downwardly from the pattern value, a current passes in one or the other direction into the main regulator 37 and causes it to produce positive or negative pulses. These pulses are amplified in the last (power amplifying) stages 38 and 40 respectively of the main current regulator 37.

The amplified pulses are applied to ignition-angle control sets 39 and 41 which are connected to the respective grid-cathode circuits of the two valve groups 10 and 11 for shifting their respective operations between the two fixed phase positions of ignition control in the manner described above. Details of the main current regulator 37 with its end stages 38, 40, as well as details of the two ignition-angle control sets will be described below with reference to FIGS. 4 and 5, although these components are substantially the same as those more fully described in my above-mentioned copending application Serial No. 45,633, and their control performance corresponds to the one explained in the above-mentioned copending application Serial No. 850,633 with reference to FIGS. 1 to 3 of the latter application.

Figures 3, 4:
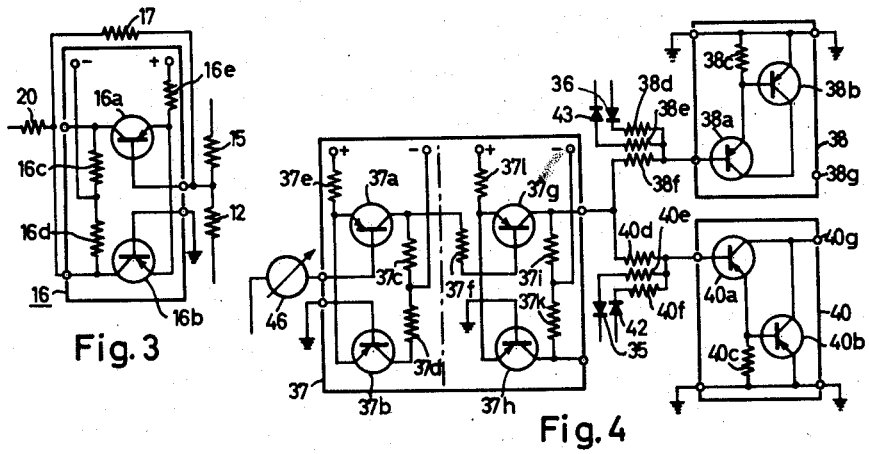
FIG. 3 is a circuit diagram of flip-flop amplifiers as used in the system according to FIG. 1 or FIG. 2.
FIG. 4 is a circuit diagram of a main current regulator with two power-amplifying end stages, also used in the system of FIG. 1 or FIG. 2.

The main current regulator 37 according to FIG. 4 comprises a pre-amplifier stage composed of two transistors 37a, 37b and resistors 37c, 37d, 37e. Connected to the output circuit of the pre-amplifier stage by a resistor 37f is a flip-flop amplifier stage which comprises two transistors 37g, 37h and resistors 37i, 37k, 37l. The two end stages 38 and 40 of the main regulator are identical power amplifiers of which one has two transistors 38a, 38b and a resistor 38c to provide an amplified signal pulse at terminal 38. The end stage 40 comprises transistors 40a, 40b and a resistor 40c to provide amplified pulses at terminal 40g.

The base-emitter input circuits of the two end stages 38, 40 are connected to the pulse-output terminal of the preceding regulator stage through respective resistors 38f, 40d. The additional signals arriving from the auxiliary regulator still to be described, are applied to the respective bases of transistors 38a and 40a through the above-mentioned diodes 35, 36 and 42, 43 in series with respective resistors 40e, 38d, 40f, 38e.

For the reasons explained, the current passing through instrument 46 into the pre-amplier stage of main regulator 37 is proportional to the difference between the pattern value and the pilot value of motor performance. This current is amplified by means of the transistors 37a and 37b which are energized from a constant-voltage direct-current supply through the resistor 37e and through respective resistors 37c and 37d. The amplified output current passes through resistor 37f into the flip-flop stage whose transistors 37g, 37h are energized from the direct-voltage supply through resistors 37l, 37i, 37k. The amplified output current passes through respective resistors 38f, 40d into the power amplifier stages 38, 40 whose output terminals 38g and 40g are connected to the respective groups of ignition-control sets 39, 41 (FIG. 1).

Figure 5:
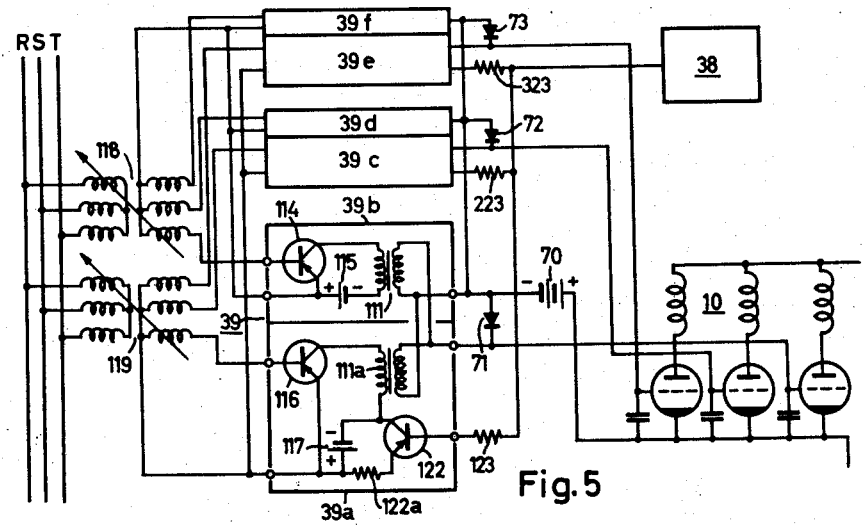
FIG. 5 is a circuit diagram of a set of ignition-control devices which form part of the same system.

The ignition-angle control sets, of which one is separately illustrated in FIG. 5, are fundamentally in accordance with those shown and more fully described in said copending application Serial No. 850,633 except that those presently disclosed are equipped with transistors which require some changes in polarity of circuit connections. Each of the two control sets is provided with three pairs of ignition-angle control devices, only those of set 39 being shown in FIG. 5 because the set 40 is identical therewith. The three pairs of devices in FIG. 5 are denoted by 39a/39b, 39c/39d and 39e/39f. The three pairs of devices in each set are identical so that only one of them is fully shown in FIG. 5 and described presently.

The ignition-angle control device 39a comprises two transistors 116 and 122 whose emitter-collector circuit is connected to a direct-current source 117 in series with the primary of a pulse transformer 111a. The associated device 39b has a transistor 114 whose emitter-collector circuit is connected to another direct-current source 115 in series with the primary of another pulse transformer 111 (or another primary of the same pulse transformer to which the transistor 116 is connected). The respective bases of transistors 116, 114 receive current from the same alternating-current line RST from which the tubes 10, 11 are energized. The transistors 114 and 116 operate as switches for generating the firing pulses to be impressed upon the control grid of the one appertaining rectifier tube in group 10. The phase angle of the firing pulses can be adjusted by varying the phase position of the base voltages with the aid of a variable transformer 118 or 119. For example, the transistor 14 may issue positive pulses at the firing angle $\alpha=0$ for full-rated control of the power rectifier, whereas the transistor 113 may be controlled by means of the variable transformer 118 to issue firing pulses for inverter operation of the power rectifiers, for example at a phase position corresponding to the phase angle $\alpha=150°$. These firing pulses are transmitted by the pulse transformers 111, 111a to the control grid of the appertaining one rectifier tube in group 10. A rectifier diode 71, preferably of solid-state type, is connected parallel to the transformer secondary windings for suppressing the negative half-waves of the pulses.

The component device 39a further comprises a transistor 122 connected in series with a resistor 122a across the direct-current source 117. The base circuit for controlling the transistor 122 is connected to terminal 38g (FIG. 4) of the power amplifier stage 38 in series with a resistor 123 (FIG. 5), the corresponding series resistors for the other control devices of set 39 being denoted by 223 and 323 respectively. The potential imposed upon the base of transistor 122 depends, as to polarity and magnitude, upon the power pulses issuing from the power amplifier stage 38 and hence upon the direction and magnitude of the regulating error signal defined by the departure of the condition-responsive pilot magnitude from the adjusted constant pattern magnitude.

If the departure is positive, that is if the actual value of motor current is larger than the datum value, the transistor 122 is conducting, the voltage source 117 for transistor 116 is shorted through transistor 122 and resistor 122a. Hence, the issuance of firing pulses having the phase angle $\alpha=0$ for full-rated rectifying operation is prevented, so that only the inverter pulses of transistor 114 can reach the rectifier tube of group 10 at the phase moment corresponding to the angle $\alpha=150°$. Due to such flip-flop switching from one to the other fixed phase-angle position, and the resulting intermittent operation of the power rectifier as a direct-current to alternating-current inverter, the direct current in the load circuit will drop accordingly until the proper operating conditions are reestablished.

If the regulating departure is negative, the transistor 122 remains turned off, and the rectifier tube of group 10 is ignited by the firing pulses of transistor 116 at the phase angle $\alpha=0$. Consequently, the direct current in the load circuit of the rectifier increases for reestablishing or maintaining the desired current value. In the latter case, the inverter pulses of transistor 114 may pass upon the control grid of the rectifier tube in group 10 at the subsequent moment corresponding to $\alpha=150°$, at which moment the rectifier tube is already conducting so that the latter pulses remain ineffective.

The overall performance of the main regulator components described above is to regulate the load current and hence the motor M (FIG. 1) in dependence upon the error signals issuing from the Hall-voltage generator 4. However, as explained, the regulation by abrupt switching between fixed ignition angles in the respective ranges of rectifying and inverting operations may cause unequal loading of the two rectifier valve groups 10, 11 of the double-Y or double-star system, but such asymmetry in loading with its resulting detriments is avoided by the corrective action of the auxiliary regulator system now to be more fully rescribed.

The auxiliary regulator system is composed of two identical branches connected in parallel relation to each other with the above-mentioned sensing circuit of members 7, 8, 9. Each of the two branches comprises two amplifiers 16 and 25 or 56 and 65 in series with each other. The two branches are substantially identical. Hence, only the upper branch with amplifiers 16 and 25 will be described in detail.

The amplifier 16 is a bistable flip-flop amplifier by virtue of a supercritical positive feedback coupling comprising a resistor 17. The amplifier, separately shown in FIG. 3, has two transistors 16a, 16b energized from the constant-voltage supply through a resistor 16e and respective resistors 16c, 16d.

Connected in the input lead of amplifier 16 is a resistor 12. Connected to the same lead is a source of constant voltage 13 through a potentiometer composed of a fixed resistor 15 and an adjustable resistor 14 of which one terminal is grounded. In this manner a negative bias voltage from source 13 is supplied to the amplifier 16 with the effect of normally holding this amplifier in one of its stable conditions.

The output lead of amplifier 16 is connected through a resistor 20 with one of the input terminals 31 of another amplifier 25 whose other input terminal 32 is grounded. The amplifier 25 (FIG. 1) may be given the same internal circuitry as shown in FIG. 3 for amplifier 16 and hence is not separately illustrated. Also connected to input terminal 31 is a negative bias voltage supplied from a voltage source 22 through a potentiometer composed of a rheostat 23 and a fixed resistor 24. The amplifier 25 is provided with an inertia-free positive feedback coupling formed by the parallel connection of a resistor 26 with a capacitor 27, and is further provided with a reactive and hence inertial negative feedback coupling comprising resistors 28, 29 and a capacitor 30. Due to the positive and negative feedback paths of amplifier 25, it also operates as a flip-flop amplifier with a bistable characteristic.

By selecting the negative bias voltage imposed by components 22, 23, 24 upon the input circuit of the amplifier 25, the magnitude of the positive input pulse and thus the width (duration) of the output pulse furnished by the amplifier can be varied. Since the amplifier 25 is essentially a push-pull amplifier with an asymmetrical input circuit and a symmetrical output circuit, it simultaneously furnishes positive and negative output pulses. The output terminal 33, corresponding to the variable-potential input terminal 31, furnishes pulses whose polarity is opposed to that of the input signal at teminal 31. The output terminal 34 furnishes pulses of the same polarity as the input signal. Located in the output lead, connecting the terminal 33 with the end stage 40 of the main current regulator 37, is a diode so poled as to block positive output pulses. The lead connecting the output terminal 34 with the end stage 38 comprises a diode 36 poled in the opposite sense so that it blocks the negative output pulses of the flip-flop amplifier 25.

Due to the negative bias from voltage source 22, the amplifier 25 is normally kept in one of its two stable end conditions. Since the positive output signal at terminal 33, corresponding to the negative input signal at terminal 31, is blocked by diode 35 from the last stage 40 of the current regulator, whereas the diode 36 blocks the negative output signal appearing at terminal 34 from reaching the regulator end stage 38, the auxiliary regulator does not pass any additional pulses to the end stages 38, 40 of the main regulator as long as the polarity of the input signal is identical with the polarity of the bias voltage applied to the amplifier 25.

The second parallel branch of the auxiliary regulator is designed and operated in the same manner as the branch described above, with the only exception that the bias voltages impressed upon the input circuit of the flip-flop amplifiers 56, 65 and supplied from respective voltage sources 53 and 62 are positive, and that the positive output pulses are passed through diode 42 onto the end stage 40 of the main regulator 37, whereas the negative pulses pass through the diode 43 to the end stage 48.

Assume that valve group 10 carries more load current than the group 11. Then an asymmetry current, whose direction, arbitrarily, may be called "positive," passes through ammeter 9 and respective resistors 12, 50 to the two branches of the auxiliary regulator. At amplifier 56 in the second branch, the only effect of the positive current from the interphase transformer is to increase the positive bias voltage from source 53, so that the asymmetry current remains without action upon the regulator. However, the amplifier 16 in the first branch will snap to its other stable limit condition as soon as the asymmetry current arriving through resistor 12 exceeds the negative current supplied from the voltage source 13. By virtue of the adjustable bias voltage from sources 13 or 53 at the entrances of amplifiers 16 or 56, the auxiliary regulator can be given any desired insensitivity with respect to asymmetrical loading of the two valve groups so that the auxiliary regulator will not issue corrective additional pulses upon occurrence of any slight difference in the load currents flowing through the respective valve groups.

The amplifier 16 can snap to its other stable condition only when a positive input pulse exceeds the bias current adjusted at rheostat 14. Analogously, the amplifier 56 snaps to its other limit condition and thus transmits an output signal to the next amplifier of the regulator branch, if the positive current supplied from voltage source 53 is exceeded by a negative asymmetry current. Thus, the sensitivity with which the additional regulator will respond is proportional to the magnitude of the bias voltages from sources 13 and 53. Preferably, this sensitivity range is made adjustable by means of a tandem or twin potentiometer consisting of two potentiometers whose slidable taps are mounted on a common shaft. Such a twin potentiometer simultaneously increases or decreases the negative bias voltages from source 13 and the positive bias voltage from source 53. When the input signal is positive, the signal at the corresponding output terminal of the first amplifier 16 or 56 is also positive and is supplied to the second amplifier 25 or 65 of the same branch.

Since amplifier 25 is a transistor push-pull device, when a positive signal arrives at input terminal 31, the output signal at the corresponding output terminal 33 is negative, whereas the signal at the second output terminal 34 is positive. The output leads of amplifier 25 comprise the above-mentioned diodes 35 and 36, so that the positive output signal, which causes control of the power rectifier groups 10, 11 for inverter operation, is transmitted to the end stage 38 of the current regulator 37 feeding the ignition-control set 39 for valve group 10. Simultaneously, the negative output pulse of amplifier 25 passes through diode 35 to the second end stage 40 of the current regulator 37 for controlling the ignition control set 41 for the valve group 11 so that this valve group receives additional ignition-control pulse at the ignition angle $\alpha=0$, which, by additional ignition of valve members, can effect an increase in load current of this group.

Now assume that the valve group 11 carries more load current than the group 10. Then an asymmetry current of negative direction is supplied to the auxiliary regulator. This negative pulse remains without effect at amplifier 16 because of the negative bias from voltage source 13. The lower branch of the auxiliary regulator can operate in the same manner as described above for the upper branch relative to a positive asymmetry current. At the exit of the lower branch, a negative pulse is transmitted through diode 43 to the end stage 38 of the current regulator 37. Analogously, positive output pulse passes through diode 42 to the end stage 40.

Figure 2:
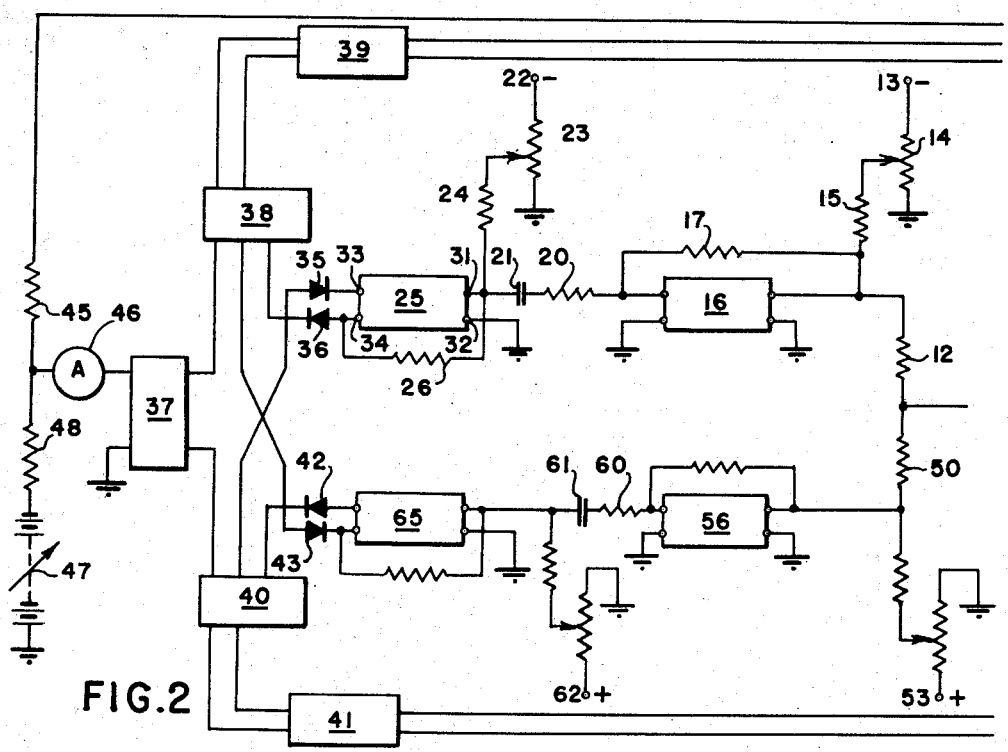
FIG. 2 illustrates a modified portion in a system otherwise corresponding to that of FIG. 1.

The rectifier system partially shown in FIG. 2 comprises the following modifications, being otherwise designed and operative like the system described above with reference to FIG. 1.

According to FIG. 2, the width (duration) of the additional pulses issuing from the auxiliary regulator can be varied by changing the bias voltage from the source 22. Such change in pulse width is effected by an RC member inserted into the output lead of the flip-flop amplifier 16 and consisting of a resistor 20 and a capacitor 21. The series-connected capacitor 21 effects an exponential decay of the arriving positive signal at the entrance of amplifier 25, which snaps into its other stable condition when the positive input pulse arrives and then remains in this condition until the positive input pulse has decayed to the magnitude of the negative bias current. Due to this relaxation effect imposed upon the amplifier 25, the width of the positive pulses decreases with increasing magnitude of the negative bias voltage from source 22. In this case, both amplifiers 16 and 25 are preferably relaxation amplifiers of substantially the same design.

Figure 9:
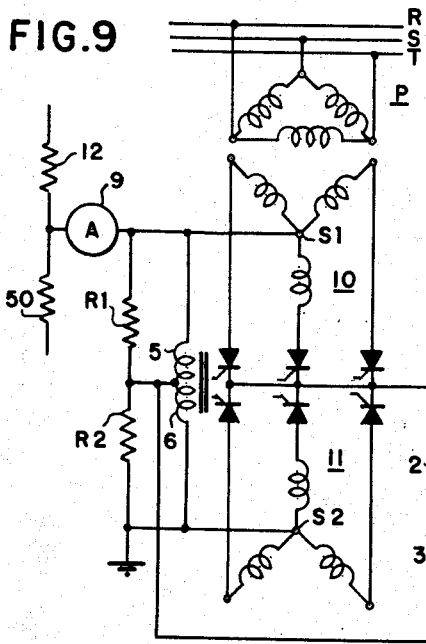
FIGS. 6, 7, 8, 9 and 10 illustrate five respective modifications of a sensing device responsive to asymmetrical current distribution in a system otherwise corresponding to FIG. 1 or FIG. 2.

The asymmetrical current distribution in the two valve groups 10 and 11 of the power rectifier can be sensed in various ways. One of the simplest ways, described above with reference to FIG. 1, is to provide two IR-drop resistors, which supply respective voltage drops corresponding to the currents in the two valve groups and which are so connected as to jointly form the difference of these voltage drops. However, the same effect can be obtained by connecting shunt resistors across the respective winding portions 5, 6 of the interphase transformer, as illustrated in FIG. 9. FIG. 9 shows only the basic circuit diagram of six-phase double-Y circuit of controllable rectifiers 10, 11 having an interphase transformer connected between the two star points, the load circuit extending between the common cathode lead of the two valve groups and the transformer mid-point. Connected across the two winding portions 5, 6 of the transformer are respective resistors R1, R2 which are series-connected in a sensing circuit otherwise corresponding to that of FIG. 1 or 2. The two voltages of resistors R1 and R2 have mutually opposed poling so that the resultant sensing voltage has a polarity and magnitude depending upon any asymmetrical current distribution.

Figure 10:
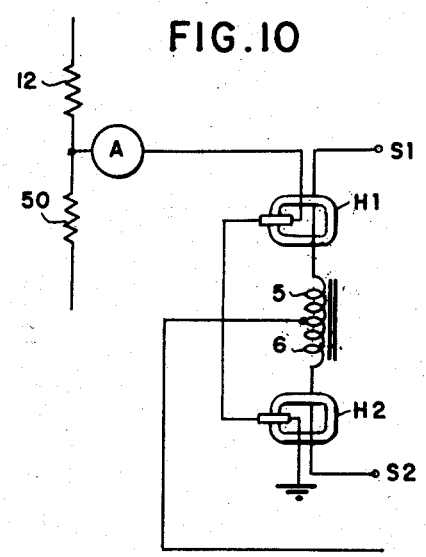

Another way of sensing asymmetrical current distribution in the two groups of valve members is to provide two Hall-voltage generators in the respective leads connected to the two winding portions 5, 6 of the interphase transformer. An embodiment of this type is shown in FIG. 10, where the two Hall generators are denoted by H1 and H2. Each Hall generator is shown to comprise a magnetizable core which surrounds a lead of winding portion 5 or 6, a semiconductor Hall plate being located in a field gap of the core. The two Hall plates are connected in voltage-opposed series relation to furnish a resultant output voltage whose polarity and magnitude are dependent upon the asymmetric current distribution to be responded to.

Figures 6, 7, 8:
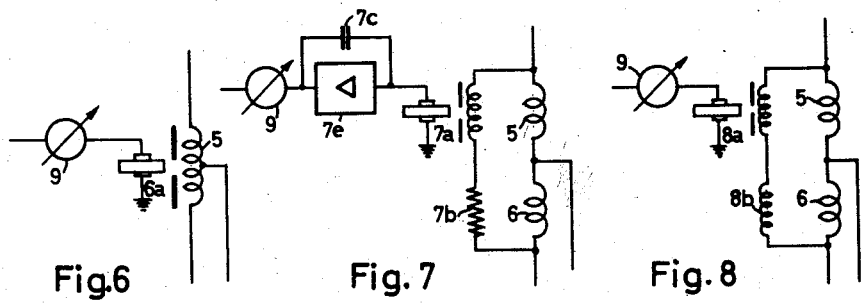

Another way of sensing the asymmetry current in the interphase transformer, is to directly build a Hall plate into the magnetizable core of the transformer. This is schematically illustrated in FIG. 6 according to which the two winding portions 5, 6 have a common ferromagnetic core 6a with a field gap in which a Hall plate H3 is located. The Hall plate H3 is traversed by the magnetic flux of the interphase transformer, this flux constituting a measure of the amount of core magnetization. Furthermore, the voltage-time integral is a measure of the amount of pre-magnetization in the interphase transformer. When using this sensing method, the voltage generated by the Hall generator is preferably supplied to the auxiliary regulator by means of an integrating device consisting, as shown in FIG. 7, of an amplifier 7e provided with a negative capacitive feedback 7c.

The asymmetrical current distribution can also be sensed by connecting a Hall-voltage generator 7a in series with a resistor 7b across the two winding portions 5, 6 of the interphase transformer, as shown in FIG. 7. Still another way is to connect a throttle coil 8b in parallel relation to the interphase transformer 5, 6, as shown in FIG. 8. The current flowing in the throttle coil is a measure of the voltage-time integral and can be sensed by means of a Hall-voltage generator 8a connected in series with the throttle coil 8b.

I claim:
1. A power rectifier system comprising an alternating-current feeder circuit, a direct-current load circuit, two multiphase groups of electric valve members in double-star connection, each member having two main electrodes and an ignition control electrode, the main electrodes of a given polarity having a common lead, an interphase transformer having two winding portions serially connected between the two star points of said respective groups, said load circuit extending from between said two winding portions to said common electrode lead, ignition-angle control means having ignition pulse circuits connected to said respective control electrodes for shifting the ignition of said valve members relative to the voltage cycle of the alternating feeder current, said ignition-angle control means having two fixed pulse phase positions in the cycle ranges of rectifying and inverting operations respectively of said valve members, condition-responsive main regulating means comprising an inertia-free electronic switching device connected to said ignition-angle control means for triggering the latter, said main regulating means being connected with said load circuit and responsive to a given operating condition of said load circuit for abruptly switching the ignition angle between said two fixed phase positions to thereby regulate said operating condition, auxiliary regulating means having a sensing circuit connected with said interphase transformer for response to asymmetrical current distribution in said two winding portions, said auxiliary regulating means having pulse generating means connected between said sensing circuit and said main regulating means for correctively controlling said main regulating means to maintain current balance in said two winding portions.

2. A power rectifier system comprising an alternating-current feeder circuit, a direct-current load circuit, two multiphase groups of electric valve members in double-star connection, each member having two main electrodes and an ignition control electrode, the main electrodes of a given polarity having a common lead, an interphase transformer having two winding portions serially connected between the two star points of said respective groups, said load circuit extending from between said two winding portions to said common electrode lead, ignition-angle control means having ignition pulse circuits connected to said respective control electrodes for shifting the ignition of said valve members relative to the voltage cycle of the alternating feeder current, said ignition-angle control means having two fixed pulse phase positions in the cycle ranges of rectifying and inverting operations respectively of said valve members, condition-responsive main regulating means comprising electronic bistable flip-flop amplifier means connected with said load circuit and responsive to a given operating condition of said load circuit for abrupting switching the ignition angle between its two stable conditions, said bistable amplifier means having separate end stages connected with the ignition-angle control means of said respective two groups for shifting the ignition angle in each group between said two fixed phase positions to thereby regulate said operating condition, auxiliary regulating means having a sensing circuit connected with said interphase transformer for response to asymmetrical current distribution in said two winding portions, said auxiliary regulating means comprising two separate pulse generating means connected between said sensing circuit and said respective amplifier end stages for controlling the latter to maintain current balance in said two groups.

3. In a power rectifier system according to claim 2, said two pulse generating means extending between said sensing circuit and said respective amplifier end stages in parallel relation to each other, each of said two pulse generating means comprising two serially interconnected flip-flop amplifiers of which the one electrically remote from said sensing circuit has two output leads connected with said respective two end stages, and two diodes serially connected in said respective two output leads with mutually inverse poling to pass positive pulses to one and negative pulses to the other end stage.

4. In a power rectifier system according to claim 3, said two flip-flop amplifiers of each of said pulse generating means having an input stage and having adjustable direct-voltage supply means connected to said input stage to apply bias voltage thereto.

5. In a power rectifier according to claim 3, said one flip-flop amplifier to which said diodes are connected having a bistable regulator characteristic.

6. A power rectifier according to claim 3, comprising an RC member connected between said two flip-flop amplifiers of each of said pulse generating means.

7. A power rectifier system according to claim 1, comprising two resistors serially connected between said two winding portions of said interphase transformer and having a common midpoint to which said load circuit is connected, and said sensing circuit comprising said two resistors in series so as to be differentially impressed from said two resistors by voltage depending as to polarity and magnitude to said asymmetrical current distribution to be responded to.

8. In a power rectifier according to claim 1, said sensing circuit comprising a Hall-voltage generating member, said two winding portions of said interphase transformer having in common a magnetizable core with a field gap in which said Hall member is located, whereby said Hall member generates a voltage depending as to polarity and magnitude to said asymmetrical current distribution to be responded to.

9. In a power rectifier system according to claim 1, said sensing circuit comprising a Hall-voltage generator and an impedance member connected serially with each other in shunt relation to said interphase transformer, and an integrating amplifier connecting said Hall generator with said pulse generating means of said auxiliary regulating means, said latter amplifier having a negative feedback path including a reactance member.

10. In a power rectifier system according to claim 1, said sensing circuit comprising a Hall-voltage generator and a throttle coil serially connected with each other and jointly in parallel relation to said two winding portions of said interphase transformer, whereby said Hall generator furnishes a voltage depending as to polarity and magnitude to said asymmetrical current distribution to be responded to.

References Cited in the file of this patent

UNITED STATES PATENTS

| | | |
|---|---|---|
| 2,243,571 | Moyer | May 27, 1941 |
| 2,243,572 | Moyer | May 27, 1941 |
| 2,335,673 | Herskind | Nov. 30, 1943 |
| 2,349,633 | Meyers | May 23, 1944 |
| 2,357,067 | Alexanderson | Aug. 29, 1944 |